(12) United States Patent
Ueno et al.

(10) Patent No.: US 12,401,667 B2
(45) Date of Patent: Aug. 26, 2025

(54) VEHICLE SECURITY MONITORING APPARATUS, METHOD AND NON-TRANSITORY COMPUTER READABLE MEDIUM

(71) Applicant: NTT Communications Corporation, Tokyo (JP)

(72) Inventors: Satoshi Ueno, Tokyo (JP); Haruki Oda, Yokohama (JP); Atsushi Wakasugi, Yokohama (JP)

(73) Assignee: NTT Communications Corporation, Tokyo (JP)

( * ) Notice: Subject to any disclaimer, the term of this patent is extended or adjusted under 35 U.S.C. 154(b) by 445 days.

(21) Appl. No.: 17/377,855

(22) Filed: Jul. 16, 2021

(65) Prior Publication Data

US 2021/0344700 A1 Nov. 4, 2021

Related U.S. Application Data

(63) Continuation of application No. PCT/JP2020/000285, filed on Jan. 8, 2020.

(30) Foreign Application Priority Data

Jan. 21, 2019 (JP) .................... 2019-007916

(51) Int. Cl.
*H04L 67/12* (2022.01)
*B60R 16/023* (2006.01)
*H04L 9/40* (2022.01)

(52) U.S. Cl.
CPC ...... *H04L 63/1425* (2013.01); *B60R 16/0232* (2013.01); *H04L 67/12* (2013.01)

(58) Field of Classification Search
CPC . B60R 16/0232; B60R 16/0315; H04L 67/12; H04L 2012/40273; H04L 12/40169; G06F 21/05; G06F 21/554
See application file for complete search history.

(56) References Cited

U.S. PATENT DOCUMENTS 9,389,147 B1 7/2016 Lambert et al.
9,721,399 B2 * 8/2017 Ishikawa .............. G07C 5/0808
(Continued)

FOREIGN PATENT DOCUMENTS

CN 106919163 A 7/2017
DE 10 2017 202 176 A1 8/2018
(Continued)

OTHER PUBLICATIONS

Japanese Office Action for Application No. 2019-007916, mailed May 10, 2022, in 11 pages.
(Continued)

*Primary Examiner* — Lynn D Feild
*Assistant Examiner* — Vladimir I Gavrilenko
(74) *Attorney, Agent, or Firm* — Knobbe, Martens, Olson & Bear, LLP (57) ABSTRACT

A vehicle security monitoring apparatus is capable of communicating with an in-vehicle network having a function of transmitting log data related to an operation state of an in-vehicle apparatus, and the vehicle security monitoring apparatus is configured to acquire the log data, and to detect an abnormal state in the in-vehicle network based on the acquired log data. The vehicle security monitoring apparatus is configured to estimate an influence range affected by the detected abnormal state, and to manage information indicating the estimated influence range.

13 Claims, 6 Drawing Sheets

(56) References Cited

U.S. PATENT DOCUMENTS

| | | | |
|---|---|---|---|
| 2005/0010697 | A1 | 1/2005 | Kinawi et al. |
| 2007/0038338 | A1 | 2/2007 | Larschan et al. |
| 2015/0094877 | A1 | 4/2015 | Tahnoose et al. |
| 2015/0191135 | A1 | 7/2015 | Ben Noon et al. |
| 2016/0171801 | A1 | 6/2016 | Kim et al. |
| 2017/0270490 | A1* | 9/2017 | Penilla .................. G06Q 10/20 |
| 2018/0294991 | A1 | 10/2018 | Tsurumi et al. |
| 2018/0295147 | A1 | 10/2018 | Haga et al. |
| 2018/0351980 | A1 | 12/2018 | Galula |
| 2019/0043354 | A1 | 2/2019 | Oluwafemi et al. |
| 2019/0050904 | A1* | 2/2019 | Wasserman .......... G08G 1/0116 |
| 2019/0182275 | A1 | 6/2019 | Ando et al. |
| 2019/0371085 | A1 | 12/2019 | Kishikawa et al. |
| 2020/0104509 | A1* | 4/2020 | Furuichi ............. H04L 63/1433 |
| 2020/0216097 | A1* | 7/2020 | Galula .................... G06F 21/51 |
| 2021/0337387 | A1 | 10/2021 | Ueno et al. |

FOREIGN PATENT DOCUMENTS

| | | | |
|---|---|---|---|
| JP | 2008-269401 A | | 11/2008 |
| JP | 2015136107 A | | 7/2015 |
| JP | 2015-225574 A | | 12/2015 |
| JP | 2017-111796 | | 6/2017 |
| JP | 2017-216583 A | | 12/2017 |
| JP | 2018-32254 A | | 3/2018 |
| JP | 2018-081349 | | 5/2018 |
| JP | 2018-81349 A | | 5/2018 |
| WO | WO 2012/080741 A1 | | 6/2012 |
| WO | WO 2018/065973 A1 | | 4/2018 |
| WO | WO 2020/145279 A1 | | 7/2020 |
| WO | WO 2020/153122 A1 | | 7/2020 |

OTHER PUBLICATIONS

Extended European Search Report for EP Application No. 20745612.0, dated Feb. 10, 2022, 9 pages.
Extended European Search Report for EP Application No. 20738799.4, dated Feb. 11, 2022, 9 pages.
International Search Report and Written Opinion for PCT Application No. PCT/JP2020/000285, dated Feb. 10, 2020, in 18 pages.
International Preliminary Report on Patentability for Application No. PCT/JP2020/000285, dated Jul. 29, 2021, in 16 pages.
International Search Report and Written Opinion for PCT Application No. PCT/JP2020/000209, dated Mar. 24, 2020, in 27 pages.
International Preliminary Report on Patentability (IPRP) for Application No. PCT/JP2020/000209, dated Jul. 22, 2021, in 20 pages.
Chinese Office Action for CN Application No. 202080010092.5, dated May 22, 2023, 25 pages.
Japanese Office Action for JP Application No. 2019-002747, dated Jul. 19, 2022, in 8 pages.
U.S. Appl. No. 17/369,774, Vehicle Information Processing Apparatus, User Terminal, Information Processing Method, and Program, filed Jul. 7, 2021.
International Search Report for PCT Application No. PCT/JP2020/000285, dated Feb. 10, 2020, in 2 pages.
International Preliminary Report on Patentability (IPRP) for Application No. PCT/JP2020/000285, dated Jun. 16, 2021, in 11 pages.
International Preliminary Report on Patentability (IPRP) for Application No. PCT/JP2020/000209, dated Jun. 16, 2021, in 13 pages.
International Search Report for PCT Application No. PCT/JP2020/000209, dated Mar. 24, 2020, in 10 pages (including translation).
Extended European Search Report for EP Application No. 20738799.4, dated Jul. 7, 2023, 4 pages.

* cited by examiner

| Attack incident type | Description | Degree of incident risk | | | |
|---|---|---|---|---|---|
| | | Information | Medium | Serious | Critical |
| Unauthorized access | Attack exploiting vulnerabilities or access aimed at authentication breach | | | High possibility of successful attack | Clear successful attack |
| DoS attack | Event rendering services unavailable | | DoS attack occurs but no influence is observed | | Service unavailability is confirmed |
| Malware | Download of malware and post-infection behavior | | Unfavorable behavior of program such as adware, etc. is confirmed | Successful downloading of malware is confirmed | Malware infection is confirmed |
| Unnatural communication | Communication violating general policy and communication of suspected defective settings | Unnatural communication is confirmed | | Defective setting causing security violation is found | |
| Investigative behavior | Investigation behavior such as network scan, vulnerability scan, etc. | | Continuous scanning occurs | | |
| Others | Not classified as above | Others | | Security defect is found during investigation | |

F I G. 5

Analysis report

| ※Analysts name | |
|---|---|
| Access to unauthorized sites (NUCLEAR Exploit Kit) | |
| ※Customer | |
| XX Corporation | |
| ※Device | Reference # |
| test_device_ids01 | 277622 |
| Data and Time | |
| 2018-07-01 15:06:1 | |

Severity — Risk degree of each incident

| ※Severity |
|---|
| Medium |
| ※Category |
| x300 Malware |

Category — Attack type for each incident

| ※Description |
|---|
| There is a possibility that Dst side host has accessed an Exploit Kit landing page.<br><br>Time:2015-06-27 15:41:19<br>Src:203.xx.yy.zz:8080<br>Dst:203.zz.yy.zz:49612<br><br>Signature:NUCLEAR Exploit Kit Detection<br>In a general drive-by download, after a user accesses an Exploit Kit landing page,<br>malware is downloaded through use of application vulnerabilities, etc.<br>Based on the PCAP obtained this time,<br>a part of JavaScript considered to have been generated in the NUCLEAR Exploit Kit was confirmed.<br>Since the URL log was not acquired, a specific access destination cannot be acquired by the SOC,<br>and further investigation cannot be performed.<br>At the present time, a communication considered to be a malware in |

Recommendation/Action — Recommended customer response to attack

| ※Recommendation/Actions |
|---|
| The following actions are recommended:<br>(1) Check a proxy log, etc., and check whether the host access destination is intended for business.<br>(2)If the host accessed a suspicious site, scan the host using antivirus software,<br>and check whether suspicious communication has occurred in the peripheral NW devices. |

F I G. 6

VEHICLE SECURITY MONITORING APPARATUS, METHOD AND NON-TRANSITORY COMPUTER READABLE MEDIUM

CROSS-REFERENCE TO RELATED APPLICATION

This application is a Continuation Application of PCT Application No. PCT/JP2020/000285, filed Jan. 8, 2020 and based upon and claiming the benefit of priority from the prior Japanese Patent Application No. 2019-007916, filed Jan. 21, 2019, the entire contents of all of which are incorporated herein by reference.

BACKGROUND

Recently, vehicles such as automobiles include many vehicle-mounted control devices such as a vehicle-mounted control device that configures a navigation system, a vehicle-mounted control device that electronically controls various vehicle-mounted devices such as an engine and a brake, and a vehicle-mounted control device that controls devices such as a meter that displays various states of vehicles. In a vehicle, the vehicle-mounted control devices are electrically connected to each other by a communication line to construct an in-vehicle network, via which various data is transmitted and received between the vehicle-mounted control devices.

The in-vehicle network is required to have extremely high security because each vehicle-mounted control device connected to the network has a function for controlling various vehicle-mounted devices such as an engine and a brake mounted on the vehicle. However, such an in-vehicle network is generally isolated from an external network. Accordingly, an in-vehicle network such as a control area network (CAN) is designed on the assumption that data transmitted and received in the in-vehicle network is authorized data transmitted from an authorized vehicle-mounted control device.

On the other hand, recently, a system capable of transmitting and receiving various kinds of data between such an in-vehicle network and an external network, and transmitting and receiving various kinds of data to and from an external device connected to a data link connector (DLC) provided on a vehicle, has been developed. A vehicle equipped with this type of system is generally called a connected car, and is used to realize advanced services such as updating map data in a navigation system and automatic driving.

However, in the connected car, since the in-vehicle network can be connected to an external network, there may be a threat of cyber-attack deployed with some malware, a virus, or the like from the external network. If the connected car is subject to cyber-attacks, there is a possibility that, for example, a false control command is executed to cause vehicle malfunctions, and software or control data of the vehicle-mounted control device is falsified.

Accordingly, various techniques for detecting evidence of tampering with the in-vehicle system, such as software or control data of the vehicle-mounted control device and failure due to tampering, have been considered (see, for example, Jpn. Pat. Appin. KOKAI Publication No. 2018-081349).

SUMMARY

According to the first aspect of the present invention, the abnormal state is detected based on the log data transmitted from the in-vehicle network of the vehicle, and the range of influence affected by the abnormal state is estimated. Accordingly, it is possible to extend the target of countermeasures not only to the vehicle in which the abnormal state is detected but also to the range of influence affected by the abnormal state. As a result, for example, in a case where a program of the in-vehicle network of the vehicle is subject to tampering by cyber-attack, it is possible to mount a collective response for all other vehicles or in-vehicle networks related to the vehicle or the in-vehicle network.

That is, according to each aspect of the present invention, it is possible to provide a technology that enables execution of more effective security measures based on log data transmitted from an in-vehicle network.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinafter, embodiments according to the present invention will be described with reference to the drawings.

Embodiment

CONFIGURATION EXAMPLE

Figure 1:
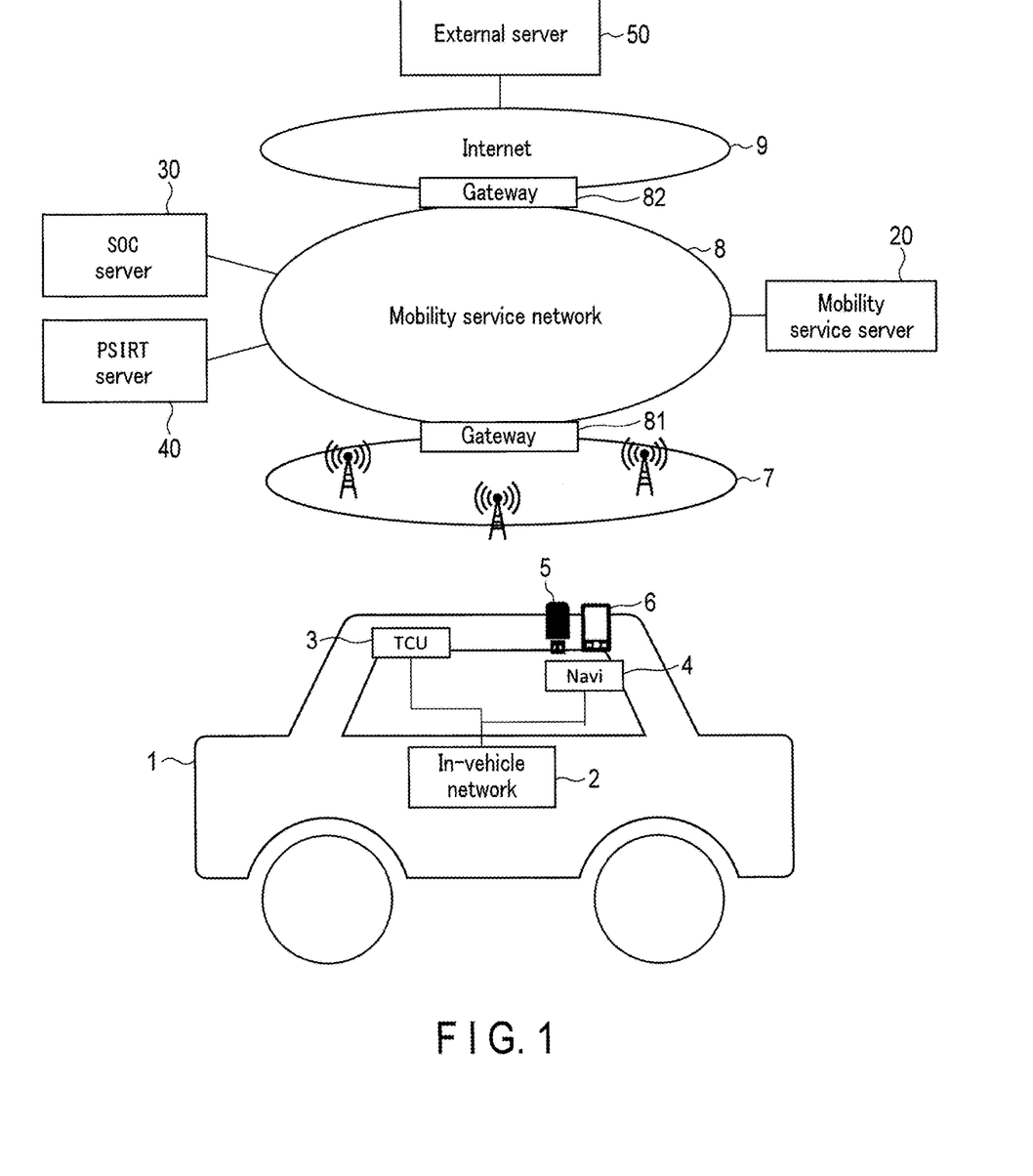
FIG. 1 is a block diagram showing the overall configuration of a vehicle information communication system including a vehicle security monitoring apparatus according to an embodiment of the present invention.

FIG. 1 is a diagram showing the overall configuration of a system including a vehicle security monitoring apparatus according to an embodiment of the present invention.

The vehicle security management system according to the embodiment includes, for example, a mobility service network 8 as a main device. The mobility service network 8 is connected to a mobility service server 20, a security operation center (SOC) server 30, and a product security incident response team (PSIRT) server 40.

The mobility service network 8 is capable of communicating with an in-vehicle network 2 mounted on a vehicle 1 via a mobile communication network 7. Further, the mobility service network 8 is also capable of communicating with an external server 50 via the Internet 9.

The mobile communication network 7 and the mobility service network 8, and the mobility service network 8 and the Internet 9 are connected to each other via, for example, gateways 81 and 82, respectively, serving as an inter-network connection device. As the mobile communication network 7, for example, a cellular mobile communication network or a wireless local area network (LAN) is used.

The in-vehicle network 2 is called, for example, a control area network (CAN) and includes a plurality of in-vehicle electric control units (ECUs). Each ECU is configured to perform a predetermined control function by causing a processor to execute a program. For example, the ECU is used as a device for controlling an engine, a transmission, a steering angle, an accelerator, a brake, or the like; a device for controlling a turn signal, a light, and a wiper; a device for controlling the opening and closing of a door lock and a window; and a device for controlling air conditioning, or the like.

In addition, the vehicle 1 is provided with multiple sensors such as in-vehicle sensors for monitoring measurement data of various in-vehicle sensors related to a vehicle operation state such as a speed sensor, a temperature sensor, and a vibration sensor and a state of a driver, and an out-of-vehicle sensor for monitoring a situation outside the vehicle, etc. The ECU is also used as a device for obtaining sensing data output from these sensors. The ECU is also used as an automatic driving control device or a device for monitoring the state of a driver.

The in-vehicle network 2 is connected to a communication control unit (TCU) 3 and a navigation device 4. The TCU 3 is used for data transmission and data receipt between the in-vehicle network 2 and the mobile communication network 7. For example, the TCU 3 is used to transmit and receive driver message data, receive navigation data from a Web site, and transmit log data indicating an operation state of the ECU to the SOC server 30.

The navigation device 4 has a USB port and a wireless interface. It has the functions of writing and reading data to and from the USB memory 5 via the USB port, transmitting and receiving data to and from a mobile terminal 6 such as a smartphone, and transmitting and receiving data to and from the outside via the wireless interface. The wireless interface, for example, making use of Bluetooth (registered trademark) or WiFi (registered trademark) is used.

The in-vehicle network 2 has an external interface port (OBD-2). A test device or a personal computer can be connected to the OBD-2. The test device and the personal computer are used, for example, to test the ECU or to install an update program or control data relative to the ECU.

The external server 50 is operated and controlled by, for example, an automotive information sharing and analysis center (Auto-ISAC). The external server 50 includes, for example, a database that stores threat information regarding cyber threats and potential vulnerabilities related to connected cars. The information stored in the database is provided to the SOC server 30.

The PSIRT server 40 is operated by, for example, a vehicle manufacturer or an organization (PSIRT) for performing necessary safety management, support, and incident response through a development life cycle of an in-vehicle apparatus. The PSIRT server 40 includes, for example, a threat information database that stores cyber threat information unique to the manufacturer. The threat information is transmitted to the SOC server 30 in response to a request from the SOC server 30. In addition, the PSIRT server 40 has a function of transmitting a recall instruction including a measurement policy or the like to a corresponding vehicle when the measurement policy or the like determined for each manufacturer is input by a manager of the PSIRT, for example. The measurement policy or the like is input based on an analysis report for security provided from the SOC server 30. The threat information is defined by, for example, a combination of a threat type and a degree of risk. The analysis report is also described using, for example, a combination of the threat type and the degree of risk.

(2) SOC Server

Figure 2:
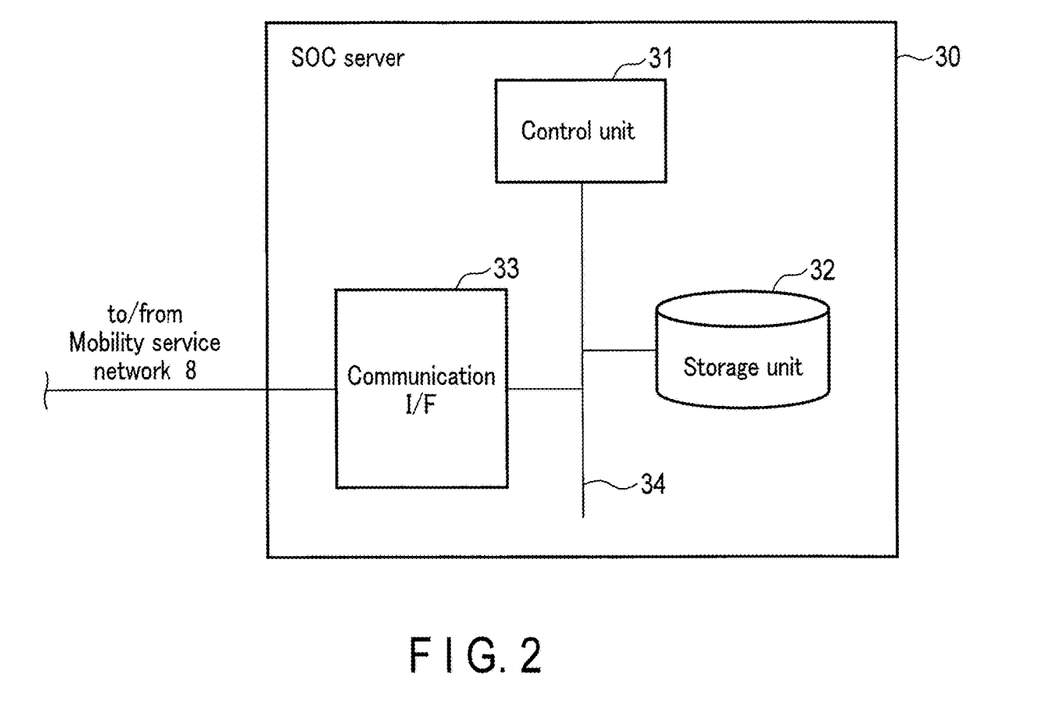
FIG. 2 is a block diagram showing a hardware configuration of an SOC server operating as a vehicle security monitoring apparatus according to an embodiment of the present invention.
Figure 3:
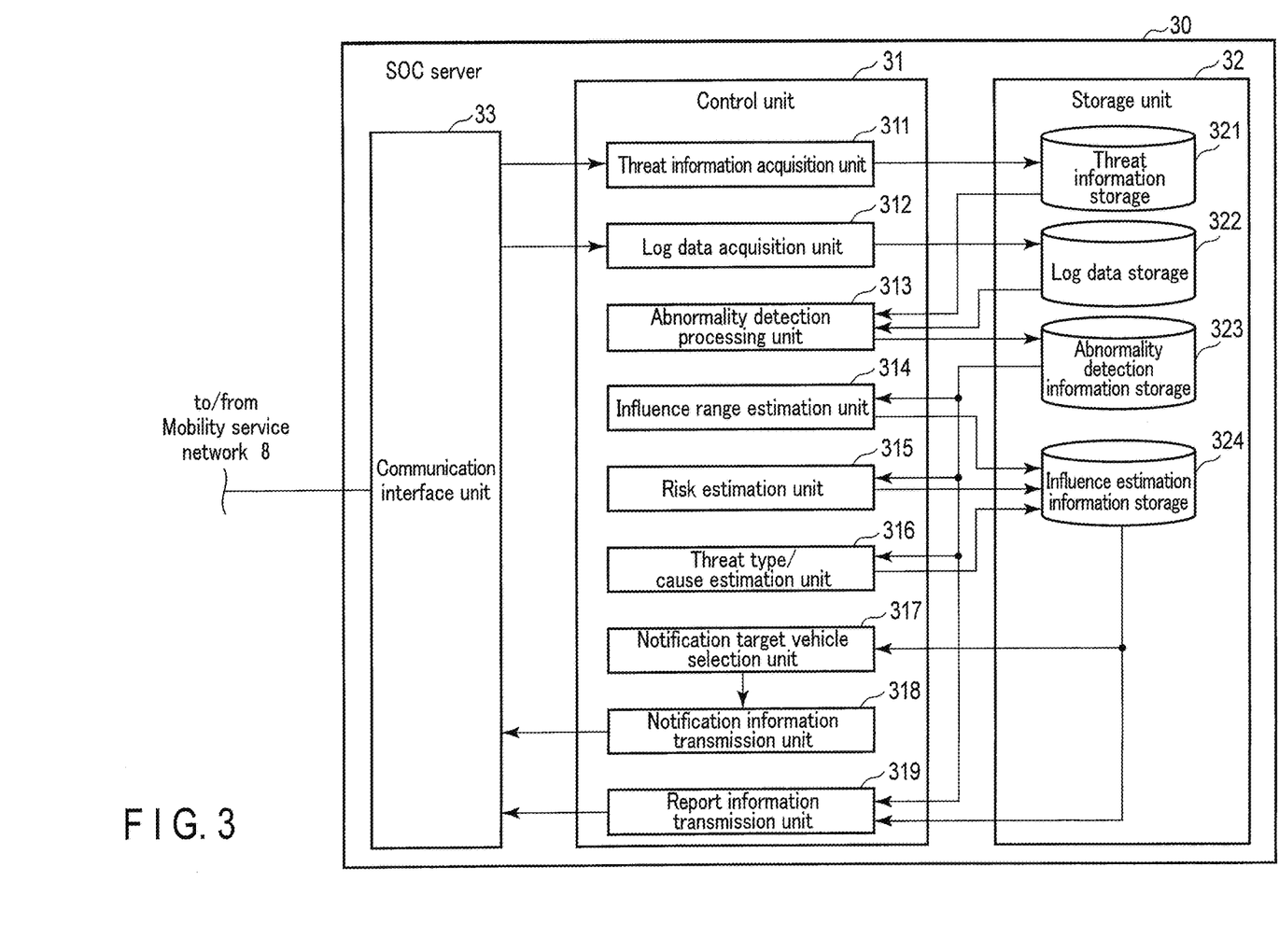
FIG. 3 is a block diagram showing a software configuration of the SOC server operating as a vehicle security monitoring apparatus according to an embodiment of the present invention.

FIGS. 2 and 3 are block diagrams showing a hardware configuration and a software configuration of the SOC server 30, respectively.

The SOC server 30 operates as, for example, a vehicle security monitoring apparatus, and includes a cloud server or a Web server. The SOC server 30 includes a control unit 31, a storage unit 32, and a communication interface (communication I/F) 33. These components are connected to each other via a bus 34.

Various data is communicated among the in-vehicle network 2, the external server 50, and the PSIRT server 40 via the communication I/F 33, according to a communication protocol used in the mobility service network 8 and the Internet 9.

The storage unit 32 includes a storage medium configured by combining a non-volatile memory such as a hard disk drive (HDD) or a solid state drive (SSD) that is capable of performing writing and reading whenever required, a read only memory (ROM), and a random access memory (RAM), and the storage unit 32 has a program storage area and a data storage area. The configuration of the storage medium is not limited to the above configuration. The program storage area stores a program required for executing various control processes according to the embodiment of the present invention, in addition to middleware such as an operating system (OS).

The data storage area includes a threat information storage 321, a log data storage 322, an abnormality detection information storage 323, and an influence estimation information storage 324.

The threat information storage 321 is used to store threat information acquired from the external server 50 and the PSIRT server 40. The log data storage 322 is used to store log data transmitted from the in-vehicle network 2. The abnormality detection information storage 323 is used to store the abnormality detection information of the in-vehicle network 2 acquired by abnormality detection processing of the control unit 31. The influence estimation information storage 324 is used to store information indicating a plurality of estimation results regarding the influence of the abnormality acquired by the control unit 31.

The control unit 31 includes, for example, a hardware processor such as a central processing unit (CPU). The control unit 31 has a threat information acquisition unit 311, a log data acquisition unit 312, an abnormality detection processing unit 313, an influence range estimation unit 314, a risk estimation unit 315, a threat type/factor estimation unit 316, a notification target vehicle selection unit 317, a notification information transmission unit 318, and a report information transmission unit 319 as control functions for realizing the embodiment of the present invention. These control function units are implemented by causing the hardware processor to execute a program stored in the program storage area of the storage unit 32.

The threat information acquisition unit 311 acquires threat information for the in-vehicle network 2 from the external server 50 and the PSIRT server 40 via the mobility service network 8. The acquired threat information is stored in the threat information storage 321. The threat information includes, for example, information indicating the type of vulnerability and the degree of vulnerability of the in-vehicle network 2 to cyber-attacks, and information indicating the type of abnormal operation and the importance thereof that may cause an accident. The threat information may be acquired not via the mobility service network 8 but via another network such as the Internet 9, or the like.

The log data acquisition unit 312 acquires log data transmitted from the in-vehicle network 2 via the mobile communication network 7 and the mobility service network 8. The acquired log data is stored in the log data storage 322. Also, log data may be acquired not via the mobility service network 8 but via another network such as the Internet 9, or the like.

The log data includes, for example, a change history of a program or control data in an ECU in the in-vehicle network 2, an operation history of an in-vehicle device and an in-vehicle apparatus by each ECU, and information indicating a communication path of various receiving data when receiving various control data or content data from an external network. The log data includes information for identifying a transmission source, an identification number of an ECU, a vehicle device, or an in-vehicle apparatus in which log data is generated, a network address assigned in advance to the vehicle 1, a time stamp indicating a generation date and time of the log data, and location information indicating a current location of the vehicle 1 as a header. The location information can be acquired by, for example, a global positioning system (GPS) receiver provided in the car navigation system.

The abnormality detection processing unit 313 determines whether the contents of the log data correspond to a threat by obtaining a correlation between the log data acquired by the log data acquisition unit 312 and the threat information stored in the threat information storage 321. In a case where it is determined that the log data corresponds to a threat, the abnormality detection processing unit 313 performs a process of storing the information which indicates the type of abnormality corresponding to the threat and the degree of correlation in the abnormality detection information storage 323 as abnormality detection information along with the corresponding log data.

The influence range estimation unit 314 performs a process of estimating the influence range of the abnormal state based on the contents of the abnormality detection information stored in the abnormality detection information storage 323 and storing information indicating the estimation result in the influence estimation information storage 324. The influence range to be estimated may include, for example, a manufacturer of a vehicle, a vehicle type, a model year, an area, an ECU, and a part in the in-vehicle network 2.

The risk estimation unit 315 estimates a degree of risk (risk level) of the abnormal operation by correlating the type of the abnormal operation included in the abnormality detection information stored in the abnormality detection information storage 323 with the threat information. The risk estimation unit 315 performs a process of storing information indicating the estimation result in the influence estimation information storage 324. The risk level indicates, for example, the degree of risk of an abnormal operation on a vehicle or a driver, and can be determined as one of, for example, four stages of "Information", "Medium", "Serious", and "Critical".

The threat type/factor estimation unit 316 estimates the abnormal state (incident) attack type based on the information added to the log data in which the abnormal state is detected. In a case where cyber-attacks are deployed with some malware, a virus, or the like, the threat type/factor estimation unit 316 estimates a transmission path and a transmission source from the communication path information of the transmission data received at the time the cyber-attacks occurred. Based on these estimation results, the threat type/factor estimation unit 316 performs a process of generating information indicating the threat type and/or the occurrence factor of the abnormal state and storing the same in the influence estimation information storage 324.

The notification target vehicle selection unit 317 selects a vehicle group in which a response to abnormality is needed, based on the information indicating the estimation results of the influence range, the risk level, and the threat type and/or the occurrence factor stored in the influence estimation information storage 324. The notification target vehicle selection unit 317 performs a process of transmitting abnormality response notification information to the selected vehicle group. The vehicle group requiring an abnormality response includes, for example, a vehicle corresponding to any one of a manufacturer, a vehicle type, and a vehicle type, or a vehicle used in a specific area.

The notification information transmission unit 318 performs a process of transmitting the abnormality response notification information via the communication I/F 33 to the mobility service network 8 directed to the vehicle group selected by the notification target vehicle selection unit 317.

The report information transmission unit 319 creates an analysis report for vehicle security including information indicating the estimation result of each of the influence range, the degree of risk, and the threat type and the occurrence factor stored in the influence estimation information storage 324 and the abnormality detection information stored in the abnormality detection information storage 323. The report information transmission unit 319 performs a process of transmitting information of the created analysis report via the communication I/F 33 to the PSIRT server 40.

(Operation)

Figure 4:
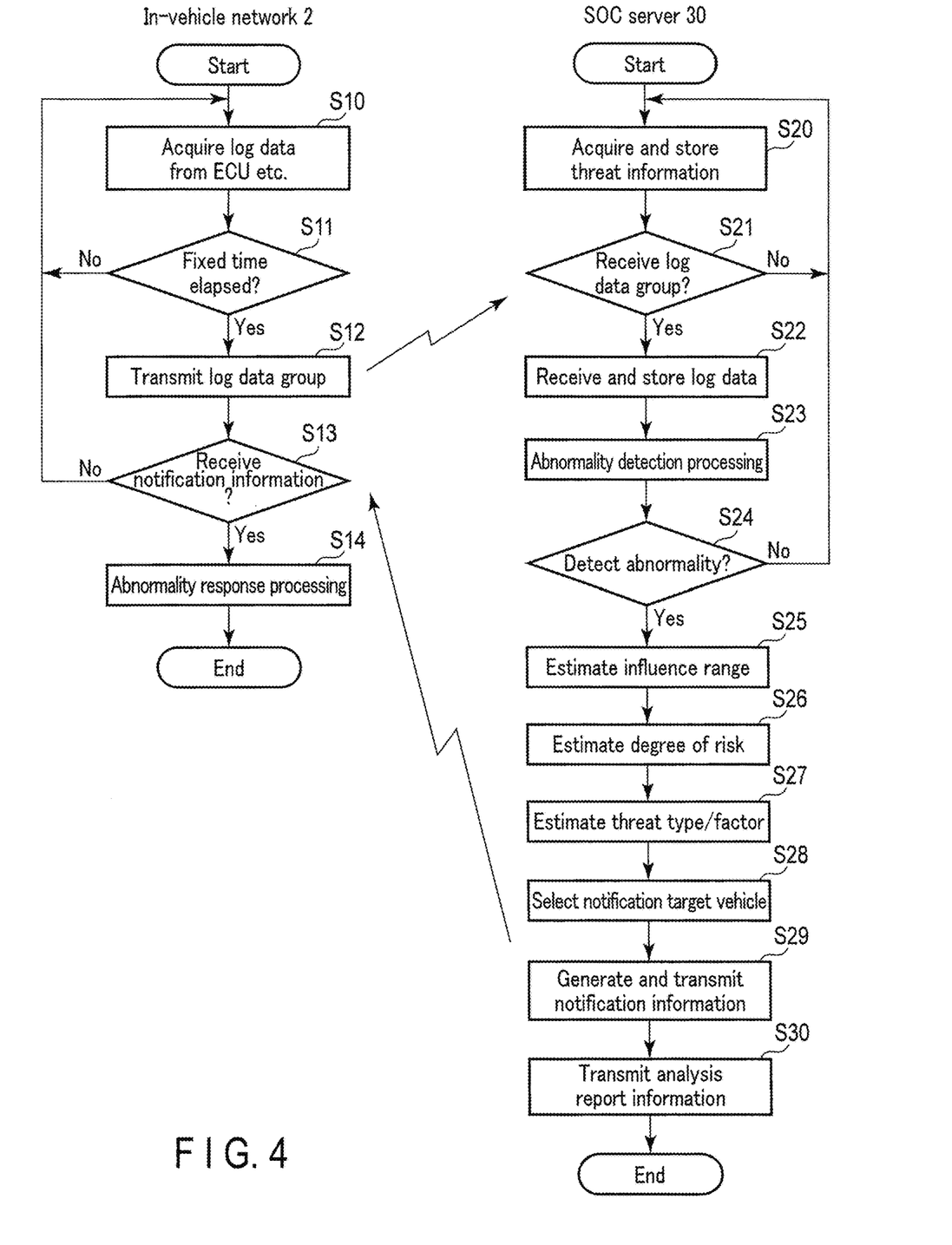
FIG. 4 is a flowchart showing a control procedure and details of the control by the SOC server shown in FIGS. 2 and 3.

Next, an operation example of the SOC server 30 with the above configuration will be described together with an operation example of the in-vehicle network 2. FIG. 4 is a flowchart showing an example of the control process and the control details.

(1) Acquisition of Threat Information

Under the control of the threat information acquisition unit 311, the SOC server 30 acquires information defining a cyber threat or a potential vulnerability related to the connected car from the external server 50 and the PSIRT server 40 at regular or arbitrary time intervals in step S20. Specifically, the SOC server 30 acquires information defined by the threat type and the degree of risk. The SOC server 30 stores the acquired information in the threat information storage 321 as threat information. The process of acquiring the threat information may be the process by which the SOC server 30 accesses the external server 50 or the like to acquire the information, or by which the SOC server 30 receives the threat information transmitted regularly or irregularly from the external server 50 or the like via a push method.

(2) Acquisition of Log Data

In the in-vehicle network 2 of each vehicle 1, each ECU and each vehicle device or apparatus constantly or periodically monitors its own operation state or the like. Log data indicating an operation history is generated based on the monitoring result. In a case where the in-vehicle network 2 receives transmission data transmitted from an external network, log data indicating a history of transmission data reception is generated.

The in-vehicle network 2 collects the generated log data in step S10 and temporarily stores it in an internal memory. The in-vehicle network 2 reads the stored log data every time a predetermined period elapses in step S11. In step S12, the read log data is transmitted from the TCU 3 to the SOC server 30. The log data may be transmitted in real time every time it is generated, without being collected for a certain period of time.

On the other hand, under the control of the log data acquisition unit 312, the SOC server 30 monitors receipt of the log data in S21. In this state, when log data is received via the communication I/F 31, the log data acquisition unit 312 acquires the received log data and stores it in the log data storage 322 in step S22. The log data acquisition unit 312 repeats the above processing every time log data is received.

(3) Abnormality Detection Processing

In each instance of new log data acquisition, the SOC server 30 reads the newly acquired log data from the log data storage 322 in step S22 under the control of the abnormality detection processing unit 313. The SOC server 30 calculates a correlation value between the information indicating the contents of the operation or the like included in the log data and the plurality of pieces of threat information stored in the threat information storage 321. The SOC server 30 stores log data in which the correlation value is equal to or greater than a threshold value in the abnormality detection information storage 323 as abnormality detection information.

For example, detection logics such as "continuous operation of a wiper in fine weather", "continuous blinking of a headlight", and "abnormal high rotation operation of the engine" are defined as threat information that defines an unnatural behavior due to falsification of a program or control data through cyber-attacks, a bug of a program, or the like. In a case where the contents of the log data transmitted from the in-vehicle network 2 matches any one of the detection logics, the abnormality detection processing unit 313 extracts the log data as log data including an abnormal state, and stores this log data as abnormality detection information in the abnormality detection information storage 323.

(4) Estimation of Abnormal State Influence Range

In a case where the SOC server 30 determines that the log including the abnormal state is detected in step S24, the SOC server 30 first estimates the range of influence affected by the abnormal operation in step S25 under the control of the influence range estimation unit 314.

For example, it is assumed that the abnormal states are "continuous operation of a wiper in fine weather", "continuous blinking of a headlight", and "abnormal high rotation operation of the engine", and any of the abnormal states are notified from a plurality of vehicles during a certain period. In this case, the influence range estimation unit 314 extracts the vehicle identification numbers or the chassis numbers of the plurality of detected vehicles from the log data, and determines commonality of, for example, manufacturer name, vehicle type, and vehicle model year. Based on the determination result, it is estimated whether the influence range of the abnormal operation is a specific "manufacturer", a specific "vehicle type", or a specific "model year", and the estimation result is stored in the influence estimation information storage 324 together with the corresponding log data. In addition to the vehicle manufacturer, a vendor of the vehicle or a manufacturer or vendor of the in-vehicle network 2 may be estimated as the influence range.

Furthermore, for example, when an abnormal state occurs in the "in-vehicle apparatus dedicated to the cold weather district", the influence range is estimated as the "cold weather district". The estimation result is stored in the influence estimation information storage 324 together with the corresponding log data.

Furthermore, for example, other ECUs, in-vehicle devices, or apparatus connected to the same bus as the ECU, the in-vehicle device or apparatus in which the log data indicating the operation abnormality is generated, are estimated to fall within the range of the influence affected by the abnormal operation. The estimation result is stored in the influence estimation information storage 324 together with the corresponding log data.

(5) Degree of Abnormal State Risk

Next, the SOC server 30 estimates the degree of risk (risk level) of the abnormal operation in step S26 under the control of the risk estimation unit 315. The degree of risk is estimated based on the type of abnormal operation included in the abnormality detection information and the correlation value between the abnormal operation and the threat information.

Figure 5:
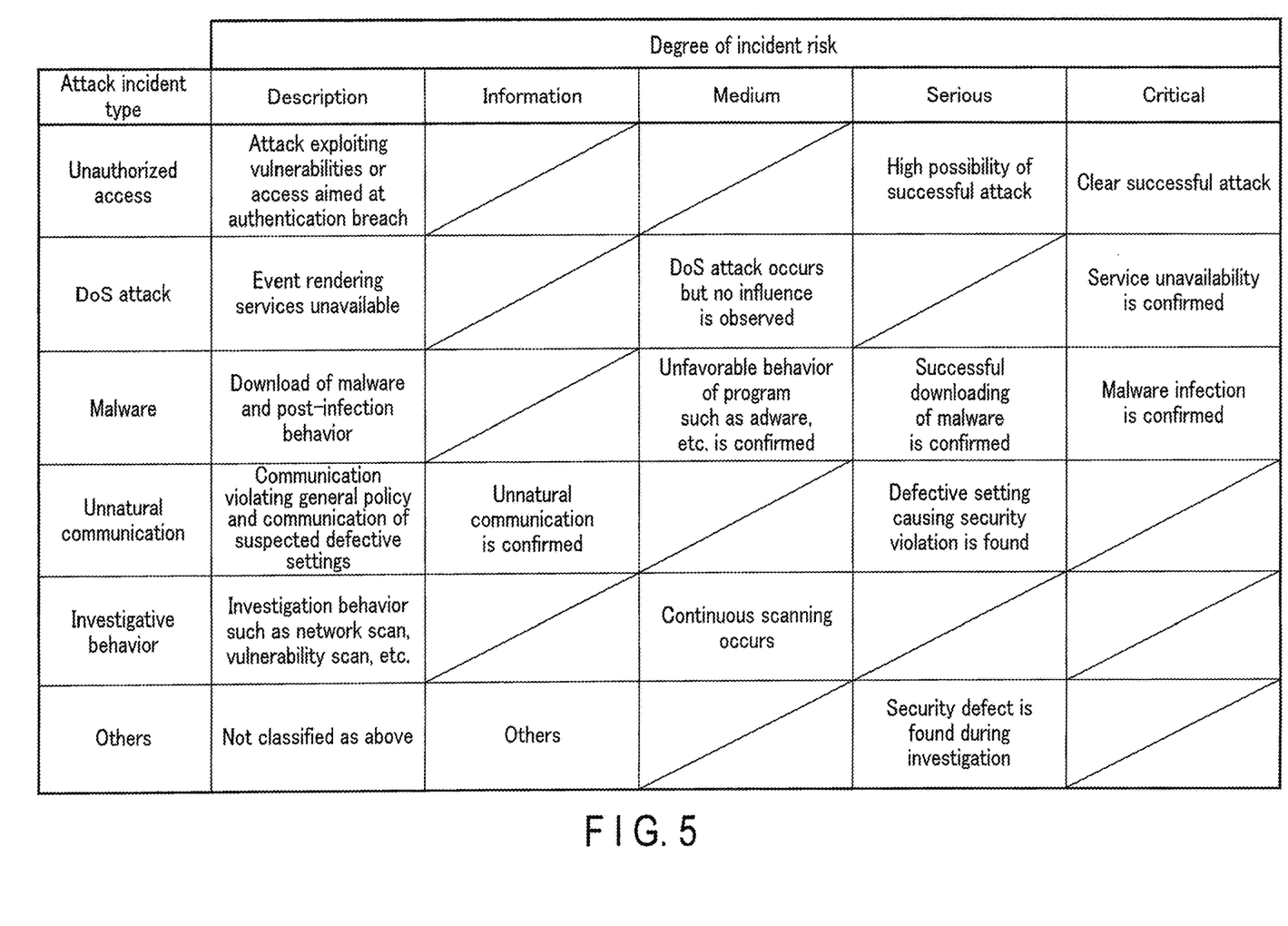
FIG. 5 is a diagram showing an example of a combination of a threat type (attack incident type) and a degree of risk (incident risk level) defined as threat information.

For example, in a case where the abnormal state type is related to a power unit such as an engine or a transmission, or the type of the abnormal state indicates suspicions that the in-vehicle network 2 has been hacked through, for example, malware or virus-based cyber-attacks, the degree of risk affecting the vehicle 1 or the driver is estimated to be high. On the other hand, in a case where the type of the abnormal state is related to the air conditioner, the degree of risk affecting the vehicle 1 or the driver is estimated to be low. Specifically, as illustrated in FIG. 5, the degree of incident risk includes four levels of "Information", "Medium", "Serious", and "Critical".

The risk estimation unit 315 stores the information indicating the estimation result of the degree of risk estimated as described above in the influence estimation information storage 324 together with the log data to which the estimation is performed.

(6) Estimation of Threat Type/Occurrence Factor of Abnormal State

Next, under the control of the threat type/factor estimation unit 316, the SOC server 30 performs a process of estimating the threat type and/or the occurrence factor of the abnormal condition in step S27. For example, based on the information indicating the log generation source included in the log data in which the abnormal state is detected, the SOC server 30 estimates in which of the ECU, the in-vehicle device, or the in-vehicle apparatus the abnormal state has occurred. For example, in a case where cyber-attacks via malware, a virus, or the like occur, information indicating an attack source and a communication path thereof, for example, an area, an ID, and a domain, is estimated by analyzing communication path information of transmission data related to the cyber-attacks. Based on the estimation results, information indicating the threat type (attack incident type) and/or the occurrence factor of the abnormal state is generated and stored in the influence estimation information storage 324. The attack incident types including six types, "unauthorized access", "DoS attack", "malware", "unnatural communication", "investigative behavior", and "others" are defined, for example, as illustrated in FIG. 4.

The processing of the threat type/factor estimation unit 316 is not limited to estimating the location of occurrence of an abnormality or the source of cyber-attacks. The threat type/factor estimation unit 316 may estimate the threat type or the occurrence factor of an abnormal state by analyzing the log data. For example, the threat type/factor estimation unit 316 may estimate the threat type or the occurrence factor of an abnormal state by extracting the feature of the waveform detected by the vibration sensor or the feature of the temperature change detected by the temperature sensor, and inputting the extracted feature data into the learning model.

(7) Selection of Notification Target Vehicle and Notification of Response Information When the process of estimating the influence range, the degree of risk, and the threat type/factor ends, the SOC server 30 selects the notification target vehicles of the response information based on the information indicating the estimation results of the influence range, the degree of risk, and the threat type or the occurrence factor stored in the influence estimation information storage 324 under the control of the notification target vehicles selection unit 317 in step S28.

For example, when the estimation result of the influence range indicates "manufacturer", "vehicle type", or "model year", the SOC server 30 acquires registration information of the vehicle owner for each manufacturer, vehicle type, or year from the PSIRT server 40 or the external server 50, and extracts an owner of the vehicle corresponding to the "manufacturer", "vehicle type", or "model year" based on the acquired registration information. Under the control of the notification information transmission unit 318, the SOC server 30 generates a response instruction to respond to the abnormality based on the estimation results of the degree of risk and the threat type and/or the occurrence factor, in step S29. The SOC server 30 transmits the notification information including the generated response instruction to the vehicle of each corresponding owner based on the extracted list of owners.

In a case where the estimation result of the influence range indicates "area", the notification information transmission unit 318 extracts vehicles located in the area based on the location information of the vehicles included in the log data. The notification information transmission unit 318 generates a response instruction to respond to the abnormal state based on the estimation results of the degree of risk and the threat type and/or the occurrence factor, and transmits the notification information including the response instruction to the vehicles located in the area.

Furthermore, the notification information transmission unit 318 sets a priority order for transmitting the response instruction based on the degree of risk. For example, in a case where an abnormal state is detected in each of the plurality of in-vehicle networks 2 in the same time period, the priority is set in descending order of the degree of risk for each abnormal state, and the notification information including a response instruction is transmitted according to the priority. As a result, for example, the notification information including a response instruction is transmitted to the vehicle in which occurs the abnormality of the power unit or the abnormality indicating suspicions that the in-vehicle network 2 has been hacked with the priority set higher than that for the vehicle in which the abnormality of the air conditioner or the power window, or the abnormality of the navigation system occurs. The notification information including the response instruction is transmitted to each notification target vehicle via the mobility service network 8 and the mobile communication network 7.

When the in-vehicle network 2 of the vehicle that has received the notification information detects the receipt of the notification information in step S13 shown in FIG. 4, the in-vehicle network 2 executes recovery processing of the in-vehicle network 2 in response to the response instruction included in the notification information in step S14. For example, in response to the response instruction, the in-vehicle network 2 recovers a program or control data of the ECU in which the operation abnormality is detected, or resets the operation state of the in-vehicle device or apparatus.

(8) Creation and Transmission of Analysis Reports

Furthermore, under the control of the report information transmission unit 319, the SOC server 30 creates an analysis report including information indicating the influence range, the degree of risk, and the threat type and/or the occurrence factor stored in the influence estimation information storage 324, and the abnormality detection information stored in the abnormality detection information storage 323 in step S30. The SOC server 30 transmits the created analysis report to the PSIRT server 40 of the corresponding manufacturer.

Figure 6:
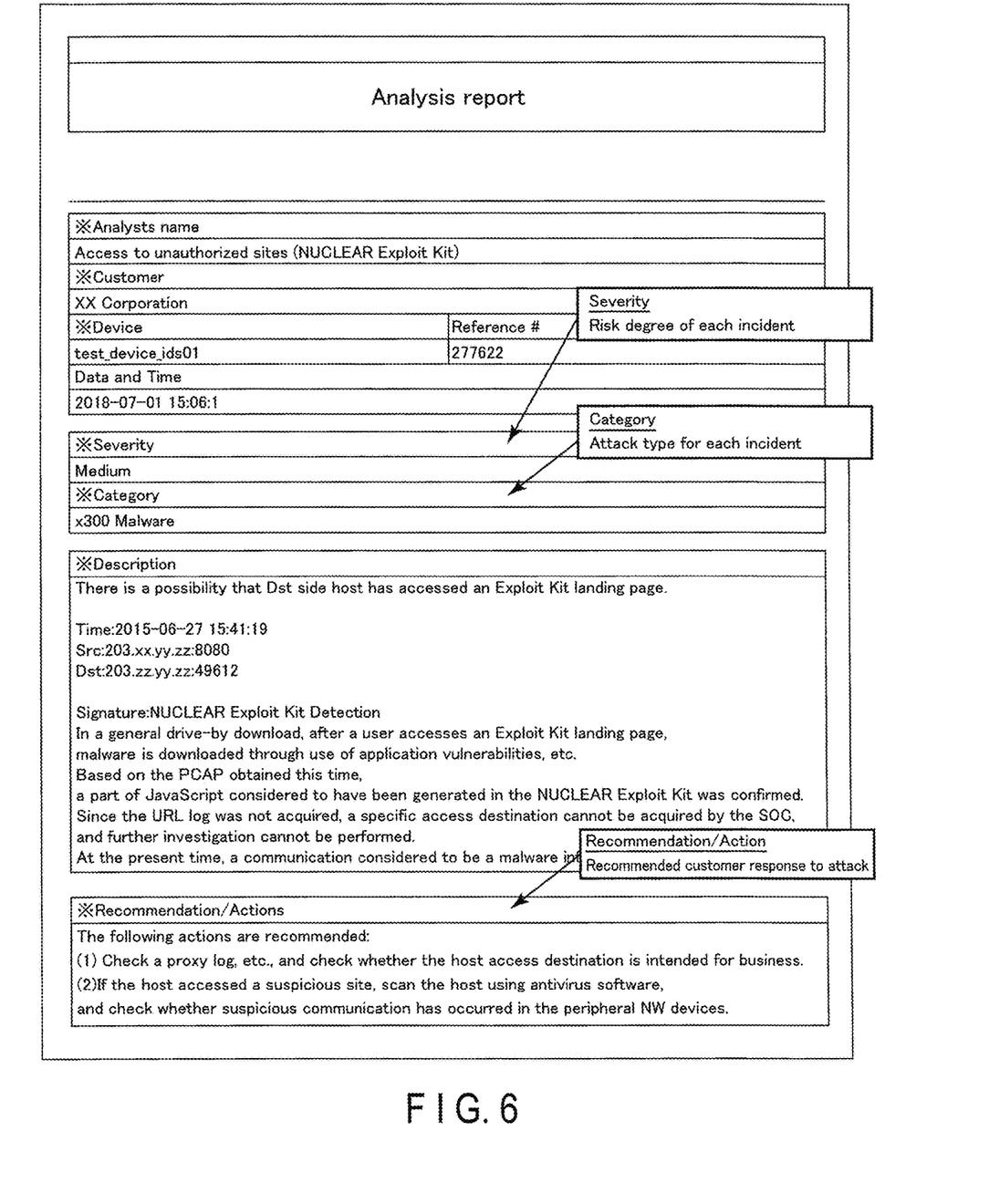
FIG. 6 is a diagram showing an example of an analysis report.

In the analysis report, for example, a message indicating the estimated threat type (attack incident type) and/or the occurrence factor, the degree of incident risk, and the recommended response action is described. FIG. 5 shows example combinations of threat types (attack incident types) and the degree of risk (incident risk levels). The example combinations include 12 combinations. FIG. 6 shows an example of an analysis report, in which the degree of incident risk is described in the "Severity" column, and the attack incident type is described in the "Category" column. In the "Recommendation/Action" column, a response message recommended for the attack is described.

On the basis of the analysis report, the manufacturer can examine, for example, a permanent recovery means for the vehicle and transmit a response instruction to the vehicle, or, in some cases, examine the possibility of recall. Furthermore, this can be reflected in the design of the in-vehicle network 2 mounted on the vehicle to be developed later.

Advantageous Effects

As described above in detail, in one embodiment, the SOC server 30 acquires log data transmitted from the in-vehicle network 2, and detects log data indicating an abnormal operation by obtaining a correlation between the acquired log data and threat information. Based on the detection information of the abnormality, the range of influence affected by the abnormality, the degree of risk, and the threat type and/or occurrence factor of the abnormality are estimated, and based on the estimation results, a notification target vehicle for the response instruction is selected, and the response instruction is transmitted to the selected vehicle.

Accordingly, based on the log data transmitted from the in-vehicle network 2 of the vehicle, the range of influence affected by the abnormal state indicated by the log data is estimated, a vehicle group corresponding to the range of influence is selected, and the response instruction is notified to the vehicle group. Therefore, it is possible that the response instruction is transmitted simultaneously not only to the vehicle in which the abnormal state is detected but also to other vehicles of the same manufacturer, the same vehicle type, or the same model year, for example. As a result, for example, when a program or control data of an ECU of a vehicle of a specific manufacturer, vehicle type, or model year is tampered with through cyber-attacks, the program or control data of the corresponding vehicle can be collectively recovered remotely.

In addition, a vehicle which is a notification target of the response instruction is selected based on the influence range of the abnormal state, and the instruction is notified only to the vehicle. Therefore, it is possible to notify the response instruction to all the vehicles requiring a response. On the other hand, since the response instruction is not notified to other unrelated vehicles, it is possible to prevent the other vehicles from being adversely affected.

Furthermore, when the response instruction is transmitted, it is possible to generate and transmit a suitable response instruction based on the estimation results of the degree of risk of the abnormal state and the threat type and/or the occurrence factor of the abnormality. Therefore, the program and the operation state of the ECU, the in-vehicle device, or apparatus in the in-vehicle network 2 can be more accurately recovered.

Furthermore, the priority is set to the notification target of the response instruction based on the degree of risk of the abnormal state. For this reason, it is possible to notify the response instruction to the in-vehicle network 2 in which an abnormality having a high degree of importance that affects the travel of the vehicle itself, such as an abnormality of a power unit or the hacking of the in-vehicle network 2 via cyber-attacks, for example, with the priority set higher than that for the in-vehicle network 2 in which an abnormality having a lower degree of importance is detected.

Other Embodiments (1) As a method of detecting an abnormality based on log data, for example, a learning model using a neural network or the like may be used in order to estimate an influence range of the abnormality, a degree of risk, a threat type, and/or a occurrence factor. In this case, the SOC server 30 extracts a plurality of parameters representing characteristics of an abnormal operation based on the log data, and inputs these parameters to the learning model, thereby obtaining the estimation results of an influence range affected by the abnormal operation, a degree of risk, and a threat type and/or an occurrence factor. As the parameters representing the characteristics of the abnormal operation, for example, vibration, temperature, number of rotations, speed, illuminance, ambient weather, or the like can be adopted.

(2) In the embodiment, the case where all the functions of the vehicle security monitoring apparatus are adopted in the SOC server 30 has been described as an example. However, the present embodiment is not limited thereto. For example, the functions of the vehicle security monitoring apparatus may be provided in a distributed manner between the SOC server 30 and the PSIRT server 40 or the external server 50.

(3) In addition, the type of abnormality to be detected and the detection method thereof, the method of estimating each of the influence range of the abnormal state, the degree of risk, and the threat type and/or the occurrence factor, the configuration of the vehicle security monitoring apparatus and the in-vehicle network, the processing procedure and the processing details of the vehicle security monitoring process, or the like can be variously modified without departing from the scope of the present invention.

(4) In the above-described embodiment, a general vehicle such as a passenger car, a cargo vehicle, or a two wheeled vehicle traveling on the ground has been described. However, the present invention may be applied to special-purpose vehicles such as business vehicles, for example buses and taxis, construction vehicles, agricultural vehicles, and ambulance vehicles; and may also be applied to vehicles such as flying objects, for example airplanes, helicopters, and drones; ships traveling on water, such as fishing ships, passenger ships, cargo ships, and tankers; and railroads traveling on tracks such as streetcars and monorails.

(5) Each embodiment may be implemented in a suitable combination with others and leading to possible gains through combination. Furthermore, the embodiments include inventions of various stages, and a variety of inventions can be derived by properly combining the structural elements disclosed in connection with the embodiments. For example, even if some structural elements are deleted from all of the structural elements mentioned in the embodiments, in the case where the problem described in the problem to be solved column can actually be solved, and the effect described in the effect of the invention column can actually be achieved, the structure from which the structural elements are deleted can be extracted as an invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

What is claimed is:

1. A vehicle security monitoring apparatus capable of communicating with an in-vehicle network having a function of transmitting log data related to an operation state of an in-vehicle apparatus of a first vehicle, the vehicle security monitoring apparatus comprising:
a non-volatile memory configured to store a program; and
a hardware processor configured to execute the program that, when executed, causes the hardware processor to:
acquire the log data indicating an operating state of the in-vehicle apparatus;
detect an abnormal state of the in-vehicle apparatus in the in-vehicle network based on a correlation between the log data and threat information stored in a threat information storage;
identify a plurality of vehicles that are determined to include an abnormal state of an in-vehicle apparatus corresponding to the abnormal state of the in-vehicle apparatus of the first vehicle;
extract, from the log data, a vehicle identification number of the first vehicle;
determine, based on the vehicle identification number of the first vehicle and vehicle identification numbers of the plurality of vehicles, a commonality between the plurality of vehicles and the first vehicle, wherein the commonality is based on one or more of a vehicle manufacturer, a vehicle type, a vehicle model year, or a location of the plurality of vehicles and the first vehicle;
estimate an influence range affected by the abnormal state based at least in part on the commonality, wherein the influence range corresponds to an estimate of a range of influence of the abnormal state, and wherein the range of influence corresponds to a number of vehicles affected by the abnormal state;
store an estimated influence range with the log data;
manage information indicating the estimated influence range; and apply a countermeasure of the abnormal state to each vehicle within the influence range.

2. The vehicle security monitoring apparatus according to claim 1, wherein the hardware processor is further configured to execute the program to:
estimate a degree of risk caused by the abnormal state; and
manage information indicating the degree of risk.

3. The vehicle security monitoring apparatus according to claim 2, wherein the hardware processor is further configured to execute the program to:
set a priority for a notification target of a response based on information indicating the degree of risk; and
transmit notification information including information indicating a response to a notification target according to the priority.

4. The vehicle security monitoring apparatus according to claim 1, wherein the hardware processor is further configured to execute the program to:
estimate at least one of a threat type and an occurrence factor of the abnormal state; and
manage information indicating at least one of the threat type and the occurrence factor.

5. The vehicle security monitoring apparatus according to claim 4, wherein the hardware processor is further configured to execute the program to:
generate response instruction information including a response action corresponding to an abnormal state based on the abnormal state, and information each piece of which indicates at least one of the influence range, a degree of risk, the threat type, and the occurrence factor; and
transmit the response instruction information to a notification target.

6. The vehicle security monitoring apparatus according to claim 5, wherein the hardware processor is further configured to execute the program to:
store information defining a combination of a threat type and a degree of risk; and
determine a notification target of a response instruction and a response action corresponding to the abnormal state with reference to information defining a combination of the threat type and degree of risk.

7. The vehicle security monitoring apparatus according to claim 1, wherein the hardware processor is further configured to execute the program to:
select a notification target of a response related to the influence range based on the information indicating the influence range; and
transmit notification information including information indicating the response to the notification target.

8. The vehicle security monitoring apparatus according to claim 7, wherein the hardware processor is further configured to execute the program to:
select a vehicle or an in-vehicle network corresponding to at least one of a manufacturer or a vendor, a vehicle type, a model year, and a use area of a vehicle in which the in-vehicle network or a system thereof is mounted as a notification target of a response related to the influence range; and
transmit notification information including information indicating the response to the vehicle or in-vehicle network.

9. The vehicle security monitoring apparatus according to claim 1, wherein the hardware processor is further configured to estimate the influence range affected by the abnormal state by applying characteristics of the abnormal state to a neural network trained to estimate the influence range.

10. A vehicle security monitoring method executed by a vehicle security monitoring apparatus capable of communicating with an in-vehicle network having a function of transmitting log data related to an operation state of an in-vehicle apparatus of a first vehicle, the vehicle security monitoring apparatus comprising:
acquiring the log data indicating an operating state of the in-vehicle apparatus;
detecting an abnormal state of the in-vehicle apparatus in the in-vehicle network based on a correlation between the log data and threat information stored in a threat information storage;
identifying a plurality of vehicles that are determined to include an abnormal state of an in-vehicle apparatus corresponding to the abnormal state of the in-vehicle apparatus of the first vehicle;
extracting, from the log data, a vehicle identification number of the first vehicle;
determining, based on the vehicle identification number of the first vehicle and vehicle identification numbers of the plurality of vehicles, a commonality between the plurality of vehicles and the first vehicle, wherein the commonality is based on a manufacturer, a vehicle type, a vehicle model year, or a location of the plurality of vehicles and the first vehicle;
estimating an influence range affected by the abnormal state based at least in part on the commonality, wherein the influence range corresponds to an estimate of a range of influence of the abnormal state, and wherein the range of influence corresponds to a number of vehicles affected by the abnormal state;
storing an estimated influence range with the log data;
managing information indicating the estimated influence range; and
applying a countermeasure of the abnormal state to each vehicle within the influence range.

11. The vehicle security monitoring method according to claim 10, further comprising estimating a degree of risk caused by the abnormal state,
wherein managing the information further includes managing information indicating the degree of risk.

12. The vehicle security monitoring method according to claim 10, further comprising estimating at least one of a threat type and an occurrence factor of the abnormal state,
wherein managing the information further comprising managing information indicating at least one of the threat type and occurrence factor.

13. A non-transitory computer readable medium storing a program that causes a hardware processor of a vehicle security monitoring apparatus capable of communicating with an in-vehicle network having a function of transmitting log data related to an operation state of an in-vehicle apparatus of a first vehicle, to:
acquire the log data indicating an operating state of the in-vehicle apparatus;
detect an abnormal state of the in-vehicle apparatus in the in-vehicle network based on a correlation between the log data and threat information stored in a threat information storage;
identify a plurality of vehicles that are determined to include an abnormal state of an in-vehicle apparatus corresponding to the abnormal state of the in-vehicle apparatus of the first vehicle;
extract, from the log data, a vehicle identification number of the first vehicle;

determine, based on the vehicle identification number of the first vehicle and vehicle identification numbers of the plurality of vehicles, a commonality between the plurality of vehicles and the first vehicle, wherein the commonality is based on a vehicle manufacturer, a vehicle type, a vehicle model year, or a location of the plurality of vehicles and the first vehicle;

estimate an influence range affected by the abnormal state based at least in part on the commonality, wherein the influence range corresponds to an estimate of a range of influence of the abnormal state, and wherein the range of influence corresponds to a number of vehicles affected by the abnormal state;

store an estimated influence range with the log data;

manage information indicating the estimated influence range; and apply a countermeasure of the abnormal state to each vehicle within the influence range.

* * * * *